W. Z. PULLIAM.
HARVESTER AND LOADER FOR BEETS, POTATOES, &c.
APPLICATION FILED MAY 3, 1920.
1,399,876.
Patented Dec. 13, 1921.
4 SHEETS—SHEET 3.
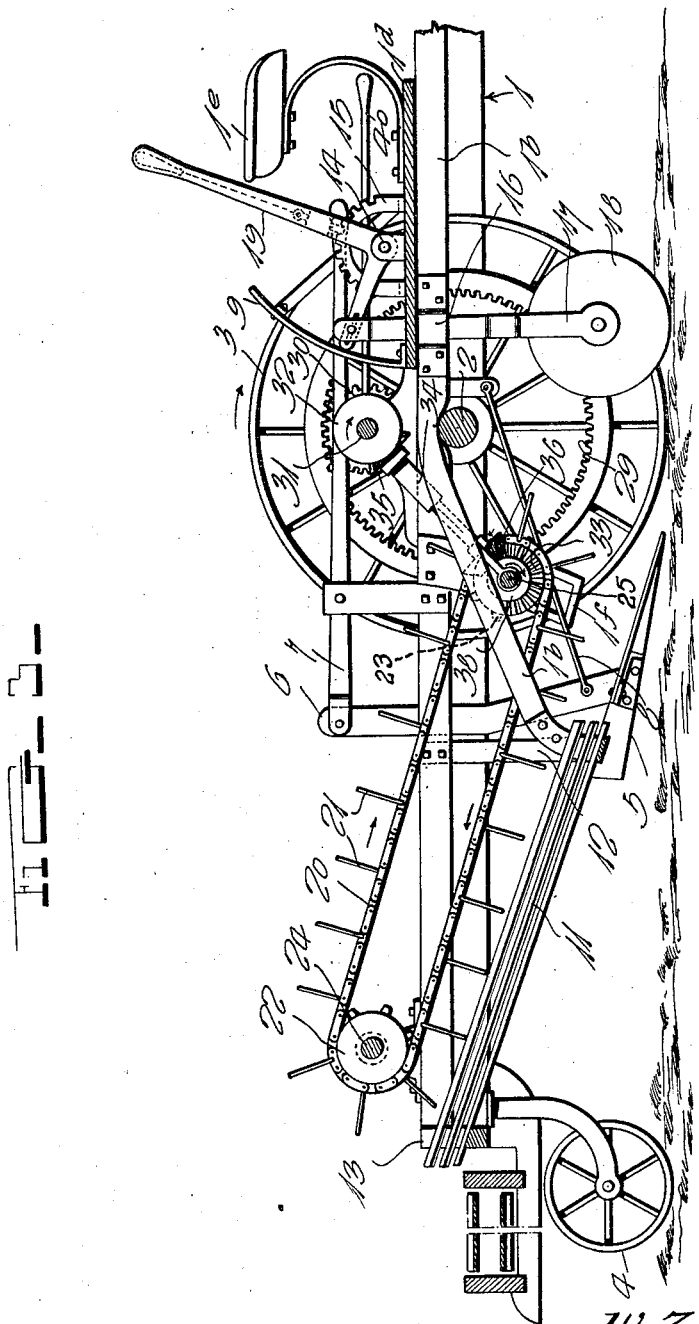
Witness
H. Woodard
Inventor
W. Z. Pulliam
By H. B. Wilson & Co
Attorneys W. Z. PULLIAM.
HARVESTER AND LOADER FOR BEETS, POTATOES, &c.
APPLICATION FILED MAY 3, 1920.
1,399,876.
Patented Dec. 13, 1921.
4 SHEETS—SHEET 4.
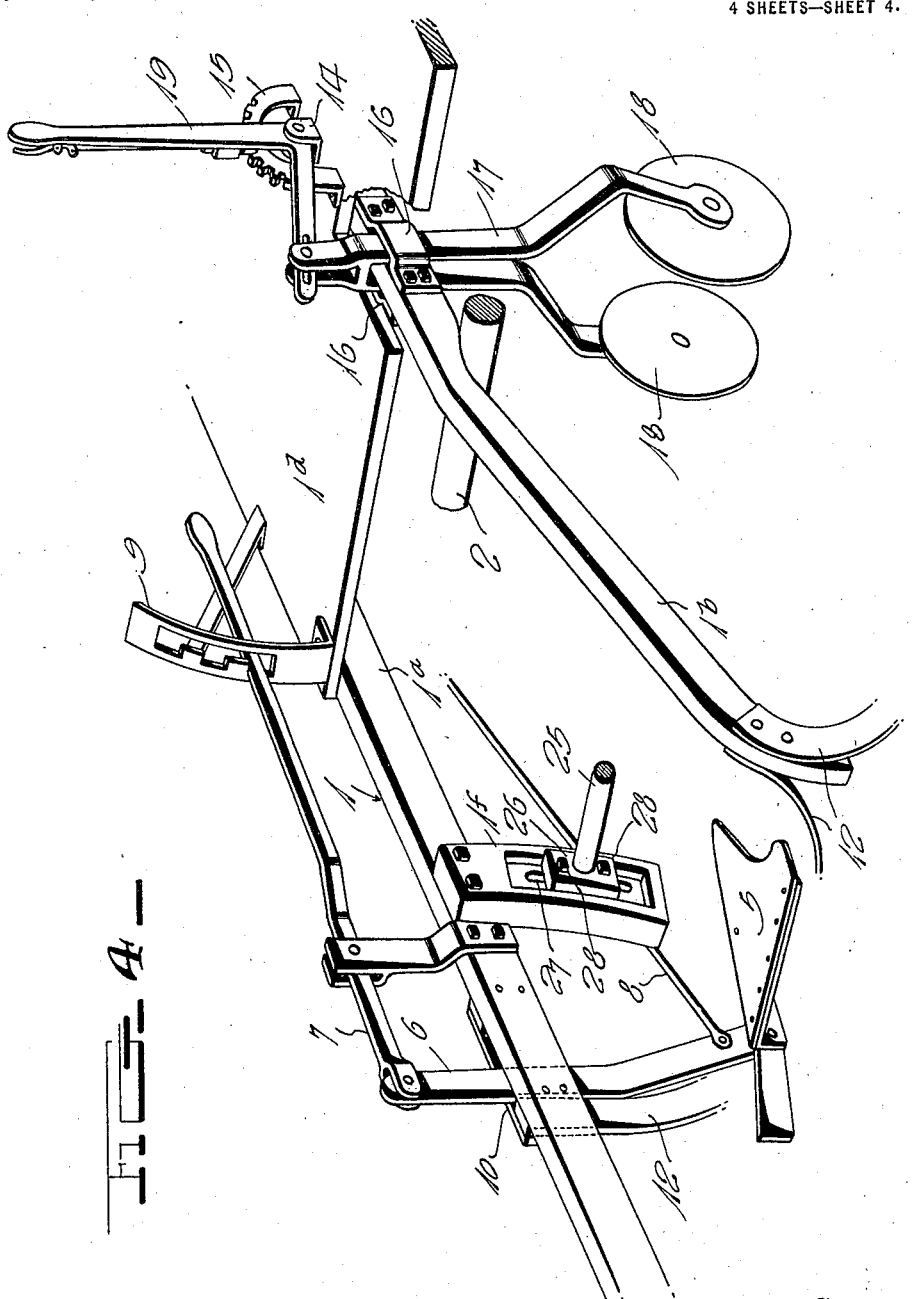
Witness
H. Woodard
Inventor
W. Z. Pulliam
By H. B. Wilson &co.
Attorneys

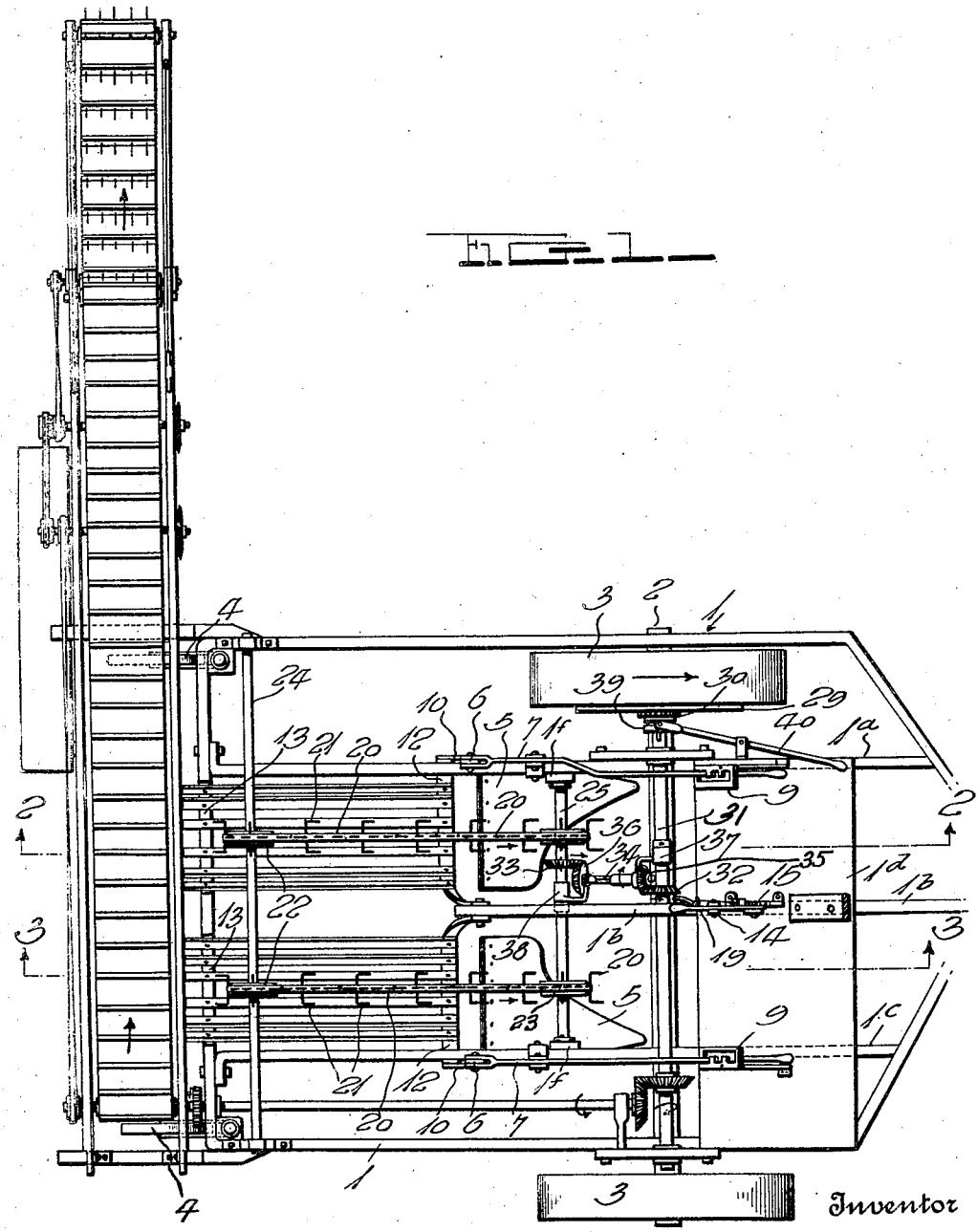

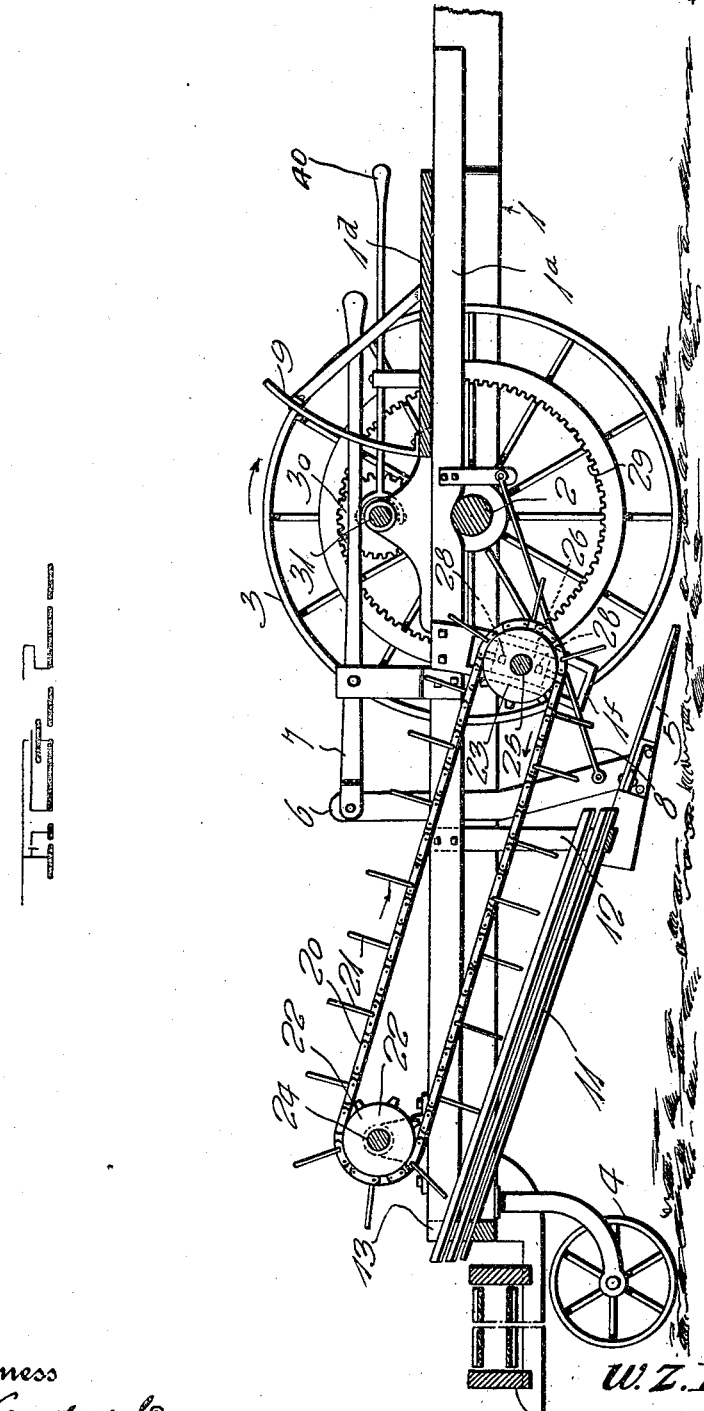

UNITED STATES PATENT OFFICE.

WILLIAM Z. PULLIAM, OF LOS ANGELES, CALIFORNIA.

HARVESTER AND LOADER FOR BEETS, POTATOES, &c.

1,399,876.      Specification of Letters Patent.      Patented Dec. 13, 1921.

Application filed May 3, 1920. Serial No. 378,509.

*To all whom it may concern:*

Be it known that I, WILLIAM Z. PULLIAM, a citizen of the United States, residing at Los Angeles, in the county of Los Angeles and State of California, have invented certain new and useful Improvements in Harvesters and Loaders for Beets, Potatoes, &c.; and I do declare the following to be a full, clear, and exact description of the invention, such as will enable others skilled in the art to which it appertains to make and use the same.

This invention relates to harvesting machines and more specifically to an improved vegetable harvester which is especially useful in the harvesting of beets, potatoes and other vegetables in which either the root or the top is in the form of a bulb or tuber.

The main object of this invention is to generally improve upon devices of this character, by providing a comparatively simple, convenient, strong and durable structure which is exceedingly efficient and practical.

Other objects and advantages will be pointed out or implied in the following details of description in connection with the accompanying drawings, in which:

Figure 1 is a top plan view of the device, the tongue or draft element being omitted.

Fig. 2 is a vertical sectional view substantially along the line 2—2 of Fig. 1.

Fig. 3 is a vertical sectional view along the line 3—3 of Fig. 1.

Fig. 4 is an enlarged detail perspective view of a portion of the machine.

Referring to these drawings in detail, in which similar reference characters correspond with similar parts throughout the several views, the invention consists in the construction and arrangement of parts which will now be described as follows:

The main frame is generally indicated by the numeral 1, and its front portion is supported by a shaft or axle 2 which is supported by the ground wheels 3, the rear portion of the frame being supported by the wheels or casters 4. The excavators are indicated at 5, and the same are rigidly secured to or united with upright bars 6 which are pivotally secured to levers 7 and to links 8, the latter having their front ends pivotally secured to depending elements on the frame 1. The levers 7 have their intermediate portions pivotally secured to upright elements of the frame 1, the frame also including notched keepers 9, and the notches of each of these keepers are interchangeably engageable with the front end of the contiguous lever 7 so as to coact therewith and with the connected bar 6 for adjusting the corresponding excavator or blade 5 vertically. The frame 1 is provided with guides or bearings 10 through which the bars 6 slide up and down.

The tracks or troughs which receive the vegetables from the excavators are indicated at 11, the frame 1 being provided with hangers 12 which support the front ends of these troughs, and the rearmost transverse element or cross-beam of the frame 1 being depressed or downwardly concaved, as indicated at 13 in Fig. 4, to provide seats for the rear ends of the troughs 11. These troughs 11 are preferably formed of slats, as indicated, these slats being spaced from one another to permit dirt, gravel, etc., to fall between the same while the vegetables travel therealong.

The main frame includes longitudinally extending bars $1^a$, $1^b$ and $1^c$, and it also includes a platform $1^d$ which is supported upon these bars. The driver's seat $1^e$ is supported upon this platform, and the latter also supports a bearing 14 and a toothed segment 15. Combined guides and bearings 16 are provided on opposite sides of the frame-bar $1^b$, and a bifurcated bar or shank 17 straddles the bar $1^b$ and is slidable up and down through these bearings 16. Earth-cutting disks 18 are journaled on the lower ends of the furcations of the member 17, and its upper end is provided with a pivot which extends through the slotted arm of a lever 19. This lever is of ordinary construction, being provided with a dog or detent which engages with the teeth of the segment 15 for holding this lever in different positions. Obviously, by adjusting the lever 19 angularly, it effects a vertical adjustment of the members 17 and 18. The rear end of the frame bar $1^b$ is downwardly and rearwardly inclined and united with the elements 12 so as to support the inner ends thereof.

The rake-conveyer is indicated at 20, the same comprising an endless chain provided with rake teeth 21 and being mounted on sprockets 22 and 23 which are mounted on shafts 24 and 25 journaled in bearings supported by the frame 1. As more clearly shown in Fig. 5, the bearings 26, which carry the shaft 25, are adjustably seated in depending guides 1ᵗ of the main frame, these guides being depressed or indented in such manner that arcuate walls are provided, and the front and rear sides of the bearings 26 fit against these walls and are guided up and down thereby while being adjusted. These depending guides are also provided with arcuate slots 27 through which securing bolts 28 extend. It will be seen, therefore, that the shaft 25 and its sprockets can be adjusted to any desired elevation between predetermined limits, by loosening the bolts 28, raising or lowering the shaft 25 the desired amount, and tightening the bolts 28. The curvature of the slots and walls of the member 1ᵗ has its radial center coinciding with the axis of the shaft 24, so that the centers of the shafts 24 and 25 remain equally spaced from one another in every adjustment of the shaft 25, and such adjustment does not tighten or loosen the endless conveyer 20. By thus adjusting the conveyer 20 toward and from the excavator 5, the operator can compensate for difference in size and character of vegetables being harvested. For instance, in harvesting headed cabbage, the shaft 25 and its adjuncts should be raised so that the rake teeth engage with the cabbage heads without unduly marring them; and at the same time, the excavator 5 may be relatively high, as the cabbages are not usually deep-rooted. On the other hand, in harvesting turnips, potatoes, beets, or other small tubers, the front end of the conveyer 20 should be low so that the rake-teeth 21 will not pass over the vegetables without engaging therewith, but will engage with their tops and crowns so as to drag them rearward from the excavator onto and along the trough 11. Similarly the earth-cutting disks 18 are adjusted in accordance with the class and size of the vegetables being harvested, and also with the kind of ground being harvested from. In this connection, it is to be understood that the purpose of these disks 18 is to separate the earth which is to be raised from that which is not to be raised; that is, it is not desirable to raise any more earth than is absolutely necessary, and by the use of these cutting disks, a strip of ground between the rows of vegetables remains intact. Moreover, where the ground contains stones, tree roots, etc., these obstacles interfere with the cutting of the blades 18, and therefore, they are raised to their inoperative position, independently of the excavators 5 so that the latter operate while the cutting disks are inoperative.

Although the shaft 25 may be driven by any appropriate means, the transmission means here employed include an internal gear 29 which is carried by one of the main ground wheels 3; a gear wheel 30 meshing with this internal gear; a shaft 31 journaled in suitable bearings on the frame 1; a bevel gear wheel 32 which is united with the shaft 31; a bevel gear wheel 33 which is united with the shaft 25; a longitudinally extensible and compressible shaft 34, this shaft comprising two sections, one of these sections being longitudinally slidable and non-rotatable within the other; and two bevel gears 35 and 36, the latter meshing with the bevel gear 33, while the bevel gear 35 meshes with the bevel gear 32.

Bearings 37 and 38 are carried by the shafts 31 and 25, respectively, and these shafts 31 and 25, as well as the shaft 34, are rotatable in these bearings. In consequence of shaft 34 being longitudinally adjustable or telescopic, it does not interfere with the vertical adjustment of the shaft 25, and remains in its operative relation with the gears 32 and 33 in every adjustment of the shaft 25.

A clutch 39 is operable by means of a lever 40 and throws the gear wheel 30 in and out of gear with the shaft 31, so that the elevator will not operate when the clutch is out, as when the machine is being moved along the road or from one field to another.

When the earth is raised by the excavators 5, together with the vegetables, the latter are engaged by the teeth 21 of the endless rakes 20 and dragged from the excavator, through the tracks or troughs 11 and discharged.

It is not intended to limit this invention to the exact details of construction and arrangement shown and described in the foregoing, but changes may be made within the scope of the inventive ideas as implied and claimed.

What I claim as my invention is:

1. A harvesting machine comprising a frame including a pair of spaced longitudinal bars and a relatively short longitudinal bar disposed between them and terminating between the ends of the frame, the rear end of said relatively short bar declining rearwardly, a pair of U-shaped stirrup bars extending from said rear end of said relatively short bar to the other bars and secured to all of said bars, and rearwardly extending slats secured at their front ends to said stirrup bars; together with diggers delivering onto said slats, and conveyers operable over said slats 2. A harvesting machine comprising a frame including a pair of spaced longitudinal bars and a relatively short longitudinal bar disposed between them and terminating between the ends of the frame, the rear end of said relatively short bar declining rearwardly, a pair of U-shaped stirrup bars extending from said rear end of said relatively short bar to the other bars and secured to all of said bars, and rearwardly extending slats secured at their front ends to said stirrup bars; together with guides on said pair of spaced longitudinal bars, vertically adjustable standards received slidably in said guides and means for holding said standards in adjusted position, diggers on the lower ends of said standards delivering onto said slats, and conveyers operating over said slats In testimony whereof I have hereunto set my hand

WILLIAM Z. PULLIAM.